US007905225B2

(12) United States Patent
Contarino (10) Patent No.: US 7,905,225 B2
(45) Date of Patent: Mar. 15, 2011

(54) COOKING GRILL (76) Inventor: Alfred F. Contarino, Boxford, MA (US)

( * ) Notice: Subject to any disclaimer, the term of this patent is extended or adjusted under 35 U.S.C. 154(b) by 310 days.

(21) Appl. No.: 11/866,691

(22) Filed: Oct. 3, 2007

(65) Prior Publication Data
US 2009/0090348 A1    Apr. 9, 2009

(51) Int. Cl.
A47J 37/00 (2006.01)
F24B 3/00 (2006.01)
(52) U.S. Cl. .................. 126/41 R; 126/25 R; 126/41 D; 126/39 L; 99/341
(58) Field of Classification Search .............. 126/25 R, 126/41 R, 41 D, 41 E, 39 H–39 K, 23, 19 R, 126/36, 37 B, 38, 39 C, 39 L, 41 B, 190, 126/273; 99/396, 397, 450, 422; 219/385–535
See application file for complete search history.

(56) References Cited

U.S. PATENT DOCUMENTS

| 833,529 | A | * | 10/1906 | Jones | 99/445 |
|---|---|---|---|---|---|
| 1,751,219 | A | * | 3/1930 | Seamon | 219/474 |
| 2,015,295 | A | * | 9/1935 | Steingruber | 219/218 |
| 2,127,146 | A | * | 8/1938 | Smallen | 99/446 |
| 2,155,654 | A | * | 4/1939 | Haley | 312/334.39 |
| 2,430,582 | A | * | 11/1947 | Reich | 219/477 |
| 2,709,996 | A | * | 6/1955 | Tescula | 126/25 R |
| 2,898,846 | A | * | 8/1959 | Del Francia | 99/443 R |
| 2,940,381 | A | * | 6/1960 | Cottongim et al. | 99/445 |
| 3,169,517 | A | | 2/1965 | Maier | |
| 3,199,438 | A | * | 8/1965 | Myler et al. | 99/421 R |
| 3,443,510 | A | * | 5/1969 | Norton | 99/445 |
| 3,490,433 | A | * | 1/1970 | Busenbarrick | 126/9 R |
| 3,611,912 | A | * | 10/1971 | Choc | 99/340 |
| 3,783,855 | A | * | 1/1974 | Newinger | 126/25 R |
| 3,802,413 | A | * | 4/1974 | Pepin | 126/25 B |
| 3,947,657 | A | * | 3/1976 | Ershler | 219/450.1 |
| 4,220,133 | A | * | 9/1980 | Way, Jr. | 126/337 A |
| 4,362,093 | A | * | 12/1982 | Griscom | 99/339 |
| 4,392,419 | A | | 7/1983 | Bonny | |
| 4,516,485 | A | | 5/1985 | Miller | |
| 4,531,505 | A | * | 7/1985 | Hait et al. | 126/9 R |
| 4,718,400 | A | * | 1/1988 | Lotz et al. | 126/41 R |
| 4,800,865 | A | | 1/1989 | Setzer | |
| 4,840,118 | A | | 6/1989 | Rinehart | |
| 5,186,159 | A | | 2/1993 | Crow, Jr. et al. | |
| 5,213,027 | A | | 5/1993 | Tsotsos et al. | |

(Continued)

FOREIGN PATENT DOCUMENTS

DE    3926182 A1 *  2/1991

(Continued)

Primary Examiner — Carl D Price
Assistant Examiner — Desmond Peyton
(74) Attorney, Agent, or Firm — Saul Ewing LLP (57) ABSTRACT A cooking grill comprising a housing defining a cooking chamber and having a side opening therein, a heating element in the chamber, a drawer slidably disposed in the side opening, the drawer having a bottom tray and a front wall that substantially fills the side opening when the drawer is inserted in the housing, a grilling module adapted to sit in the drawer having a support portion for supporting a grilling surface, and a removable grilling surface, wherein the drawer can be inserted into the side opening in either a first orientation in which the bottom tray is below the heating element and the support portion is above the heating element or a second orientation rotated 180 degrees from the first orientation in which the bottom tray is above the heating element and the support portion is below the heating element.

17 Claims, 4 Drawing Sheets

U.S. PATENT DOCUMENTS

| | | | |
|---|---|---|---|
| 5,237,914 A * | 8/1993 | Carstensen | 99/445 |
| 5,259,299 A * | 11/1993 | Ferraro | 99/340 |
| 5,333,540 A * | 8/1994 | Mazzocchi | 99/421 H |
| 5,347,978 A * | 9/1994 | Zuran | 126/41 R |
| 5,368,009 A * | 11/1994 | Jones | 126/41 R |
| 5,553,601 A * | 9/1996 | Parker et al. | 126/38 |
| 5,678,531 A * | 10/1997 | Byers et al. | 126/25 R |
| 5,884,555 A * | 3/1999 | Chang | 99/425 |
| 5,960,782 A * | 10/1999 | Clements et al. | 126/37 B |
| 6,000,389 A * | 12/1999 | Alpert | 126/25 R |
| 6,024,081 A * | 2/2000 | Libertini, Jr. | 126/41 R |
| 6,039,039 A | 3/2000 | Pina, Jr. | |
| 6,064,042 A * | 5/2000 | Glucksman et al. | 219/452.13 |
| 6,114,665 A * | 9/2000 | Garcia et al. | 219/404 |
| 6,153,857 A * | 11/2000 | Gunnels | 219/386 |
| 6,158,330 A * | 12/2000 | Andress | 99/445 |
| 6,260,478 B1 * | 7/2001 | Harneit | 99/446 |
| 6,308,616 B1 | 10/2001 | Johnson | |
| 6,508,165 B2 | 1/2003 | Johnson | |
| 6,705,307 B2 | 3/2004 | Alden et al. | |
| 6,892,722 B1 * | 5/2005 | Francies et al. | 126/25 R |
| 6,931,985 B1 | 8/2005 | Attic | |
| 7,163,011 B2 * | 1/2007 | Pestrue | 126/50 |
| 2002/0017290 A1 * | 2/2002 | Hines, Jr. | 126/41 R |
| 2002/0020303 A1 | 2/2002 | Johnson | |
| 2003/0213484 A1 | 11/2003 | Alden et al. | |
| 2004/0112226 A1 * | 6/2004 | Johnston et al. | 99/339 |
| 2006/0000365 A1 | 1/2006 | Attic | |
| 2006/0112948 A1 * | 6/2006 | Ducate et al. | 126/25 R |
| 2007/0163568 A1 * | 7/2007 | Murray et al. | 126/50 |
| 2007/0277800 A1 * | 12/2007 | Chiang | 126/25 R |
| 2009/0101024 A1 * | 4/2009 | Button | 99/422 |

FOREIGN PATENT DOCUMENTS

| | | | |
|---|---|---|---|
| GB | 2143119 A * | 2/1985 | |

* cited by examiner

Figure 2:
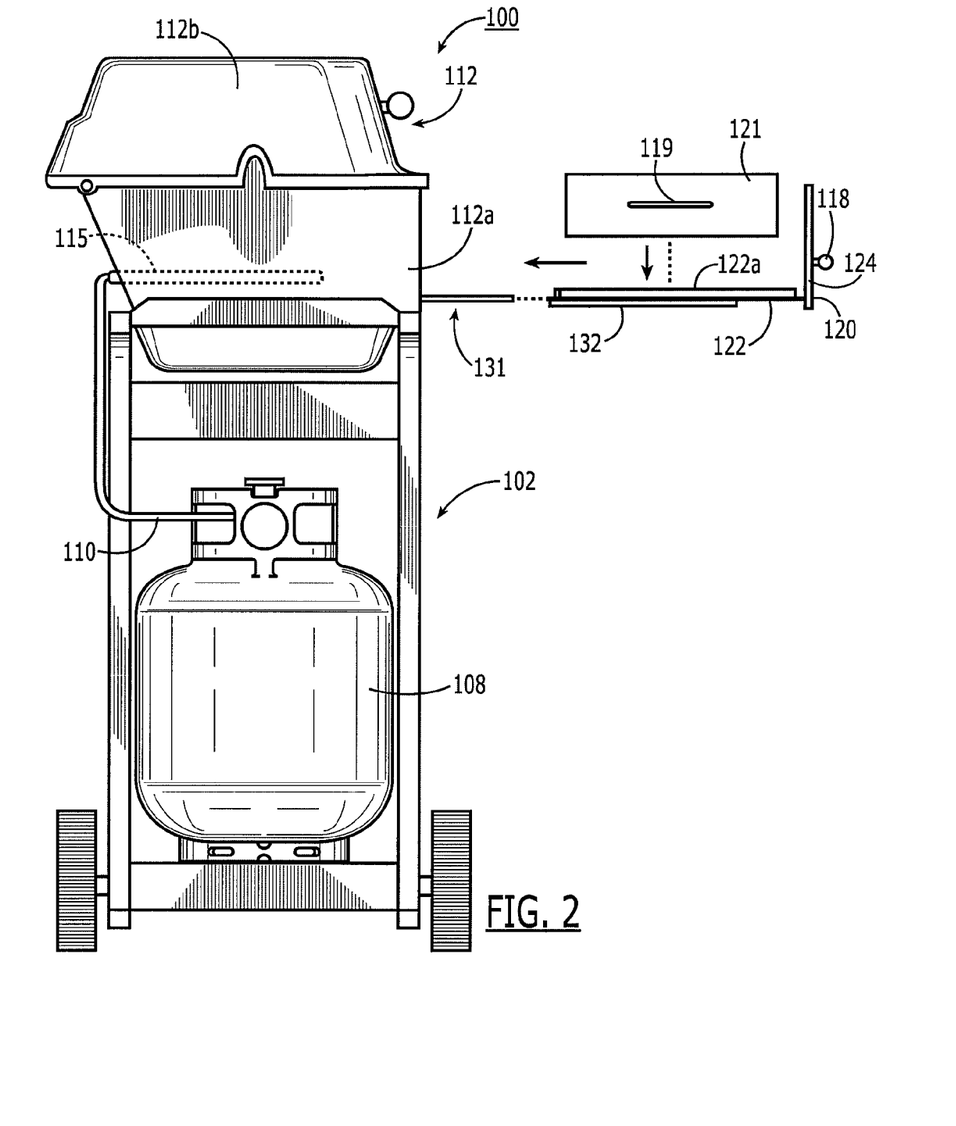

… should be understood that the grill would not normally be used with the top partially open, but with the top either fully open or fully closed. FIG. 2 is a side view of the same grill 100, but with the top closed and the side drawer partially open. Again, it should be understood that the grill would not normally be used with the side drawer partially open.

The grill 100 comprises a base or stand portion 102 comprising a plurality of legs 104 for supporting it on the ground or other horizontal surface and a shelf 106 for storage of items such as cooking supplies, cooking utensils, etc. The base 102 may be open, enclosed on one or more sides, or enclosed on all sides. If enclosed on all sides, preferably one of the sides includes or comprises a door for permitting access to the shelf or storage space. A fuel source, typically self-contained, such as a propane tank 108, is mounted somewhere on the base 102. However, in other embodiments, the grill 100 also can be connected to a permanent source of fuel, such as a household natural gas line. A fuel hose 110 typically extends from the fuel source 108 to one or more heating elements, such as flame manifolds 115 (not shown in FIG. 1, but shown in phantom in FIG. 2 and in full in FIG. 5). The flame manifolds 115 are disposed inside of a cooking chamber 113 defined by a housing 112. Housing 112 completely encloses a volume 113 including the flame manifolds 115 and within which the cooking occurs. The housing 112 comprises a bottom housing portion 112a and a top housing portion 112b connected to each other by a hinge 114 at the back of the housing 112. Preferably, a viewing window 117 made of high temperature glass is disposed in the top housing portion 112b. A first handle 116 is disposed on the front of the top housing portion 112b so that a person may grasp the first handle 116 and tilt the top half up about the hinge 114 in order to gain access to the cooking chamber 113 from above.

The grill also is equipped with controls 109 for operating the grill, such as a spark igniter and rotary knobs for controlling the rate of gas flow to the flame manifolds to control the temperature in the cooking chamber 113.

Figure 1:
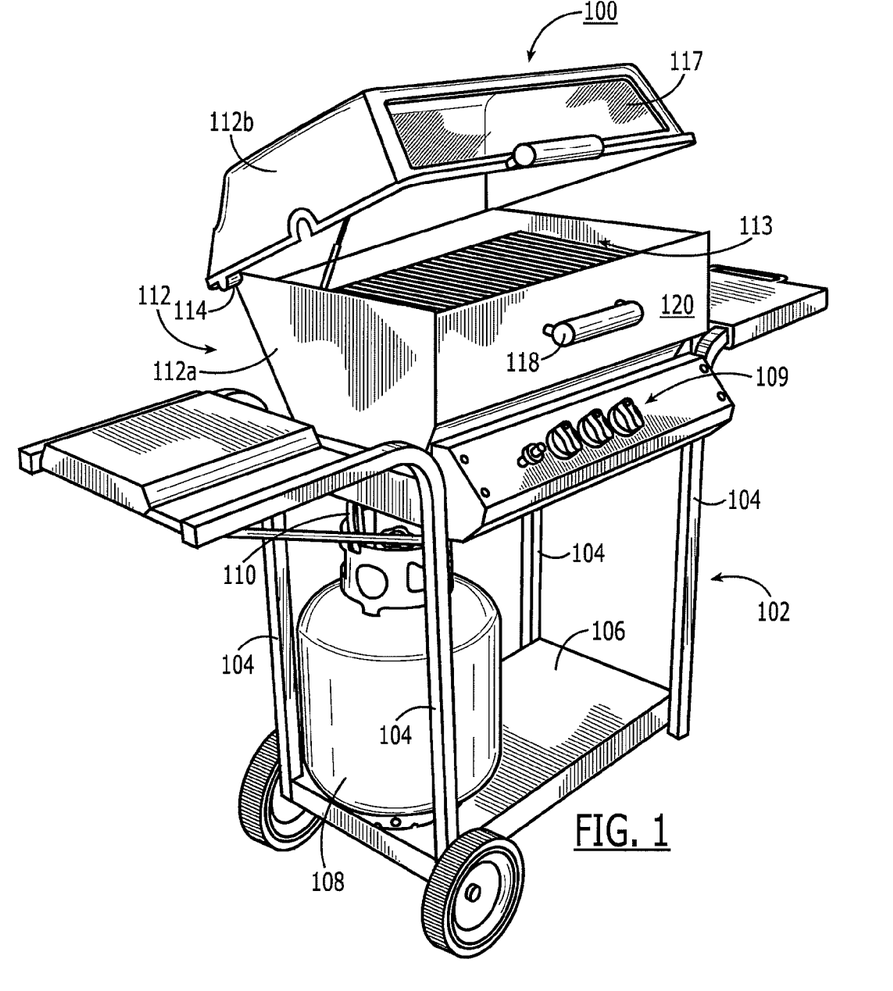

In accordance with the present invention, the grill 100 includes a second means for gaining access to the cooking chamber. Particularly, disposed in the main body 112a of the housing is a sliding drawer 120 that holds a grilling module 121, as seen in FIGS. 1 and 2 and shown in more detail in FIGS. 3 and 4. The drawer can slide horizontally outwardly from the housing 112. The drawer comprises at least a bottom tray 122 and a front wall 124. A second handle 118 is disposed on the external side of the front wall 124 of the drawer 120. This drawer is mounted on the main housing portion 112a via slides, rollers, or any other mechanism typically used for mounting a drawer to a main body so that the drawer can be slid open and closed easily. Furthermore, the drawer is completely removable from the housing 112 via any reasonable means. FIG. 2 is a side, exploded view of the grill housing 112, drawer 120, and grilling module 121, illustrating an embodiment in which the drawer is mounted to the housing by mating high-temperature slides 131, 132 on the bottom of the housing 112 and bottom of the drawer 120, respectively. Preferably, the drawer mounting mechanism is any one of several widely available drawer mounting mechanisms that includes some type of safety mechanism that requires the drawer to be maneuvered in a particular manner relative to the housing in order for it to become completely disengaged from the housing. This will prevent the drawer from accidentally falling out merely by pulling it too far out of the housing.

The grilling module 121 sits freely on the drawer 120. Preferably, the bottom surface 122 of the drawer includes a peripheral lip 122a all the way around the surface 122 inside of which the grilling module 121 is retained laterally so that the drawer cannot accidentally slide off of the drawer. Thus, the grilling module 121 must be lifted above the lip 122a to be removed from the drawer. Also, the front wall 124 preferably is solid so that, when the drawer is closed, the front wall 124 is coplanar with the front surface of the housing 112 so as to substantially seal the housing 112 to keep the heat therein.

Figure 3:
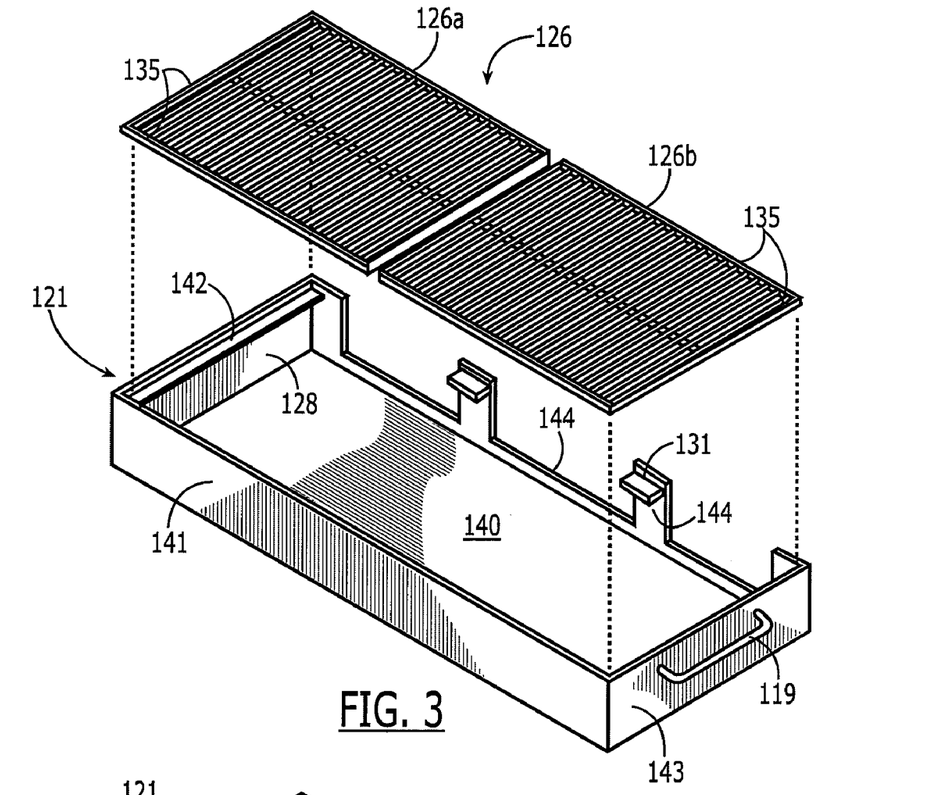
Figure 4:
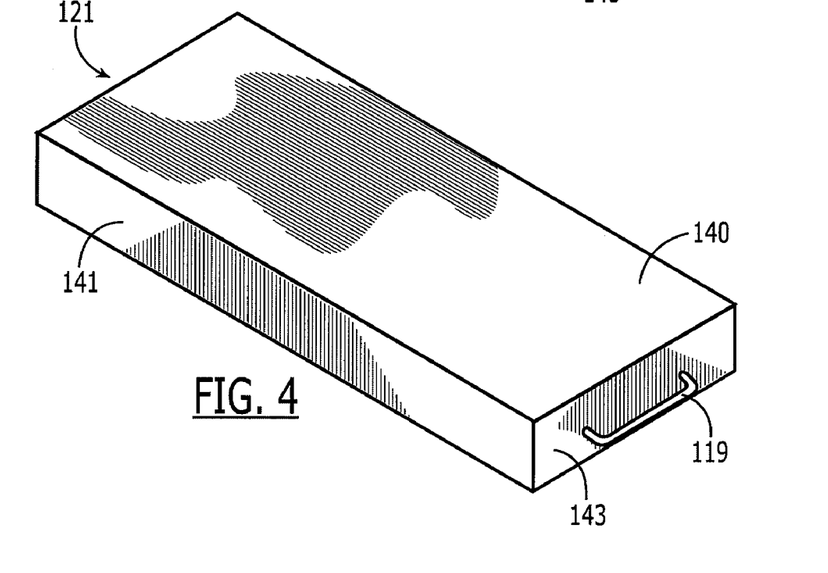

The grilling module 121 is best seen in FIGS. 2-4 and comprises a generally rectangular box with no top. Particularly, it includes a solid bottom surface 140, a solid front wall 141, two solid side walls 142, 143, and a segmented rear wall 144.

In an alternate embodiment, the drawer may not have a front wall 124, but instead the front wall 141 of the grilling module 121 forms the front surface that closes the drawer opening in the housing 112. The rear wall 144 is segmented to provide openings through which the flame manifolds 115 extend so that the flame manifolds will not interfere with the sliding of the drawer 120 (with the grilling module 121 mounted therein) in and out of the housing 112.

The front wall 141, side walls 142, 143, and segmented rear wall 144 are provided with, shaped, or bent so as to collectively define a shoulder 131 substantially around the grilling module 121 on which the peripheral edge 135 of a cooking surface (e.g., a grill) 126 can rest so as to suspend the cooking surface 126 in the grilling module 121 above and generally parallel to the bottom surface 140. The cooking surface 126 is vertically spaced from the bottom surface 140 a distance that permits the flame manifolds 115 to be positioned vertically between the cooking surface 126 and the bottom surface 140 of the grilling module 121 when the drawer 120 is closed.

In the embodiment shown in FIG. 3, for instance, the cooking surface 126 comprises two identical pieces 126a, 126b, as is conventional. However, the cooking surface may also comprise a single, unitary piece or two or more non-identical pieces.

In a preferred embodiment, the grilling module 121 and/or cooking surface 126 is equipped with one or more mechanisms to help retain the cooking surface 126 in the grilling module 121 so that it requires a small amount of force to detach the cooking surface from the grilling module. This mechanism may comprise spring clips on the cooking surface that sandwich one or more of the walls 141, 142, 143, 144 of the grilling module between two resilient legs of the clip. However, any other reasonable mechanism can be employed, including tabs formed on the peripheral edge of the cooking surface or adjacent the shoulder 131 in the grilling module so as to form a low-force friction fit or interference fit between the grilling module 121 and the cooking surface 126.

When the drawer is closed, the bottom surface 140 of the grilling module 121 is positioned beneath the flame manifolds 115 while the cooking surface 126 is positioned above the flame manifolds. Hence, the bottom surface 140 serves as a drip pan for the drippings that fall through the cooking surface 126 when food is being cooked.

The drawer can be slid out to permit the user to remove the grilling module 121 and carry it away from the grill 100, such as to a refrigerator or kitchen counter prior to cooking to place the food on the grilling module 126, rather than bringing the food to the cooking grill on a separate tray or plate. The user can insert the loaded grilling module 121 into the drawer 121 and close the drawer to commence cooking.

The user can pull out the drawer without opening the top of the grill while the food is cooking in the cooking grill to add food to the grilling module, remove food from the grilling module, or simply view the food to see how it is cooking without the need to open the top 112b of the housing 112 and thereby let all of the heat out of the cooking chamber. Only the small side opening 133 of the cooking chamber is opened when the drawer is slid out to the open position. Much less heat will escape from the cooking chamber for two reasons. First, the side opening is a much smaller opening than the opening created when the top of the housing 112*b* is tilted upwardly on the hinge 114. Second, the opening is a side opening rather than a top opening. Heat tends to rise. The heat will escape much more slowly through a side opening than through a top opening of equivalent size.

Thus, most of the heat will remain inside the cooking chamber when the drawer 120 is slid open. This is preferable to tilting the top half 112*b* of the housing open, whereby all of the heat in the cooking chamber will immediately rise up and out of the cooking chamber, essentially halting cooking by convection.

However, the present design also provides a tiltable top housing portion 112*b* so that the user still has the option of opening the top, if so desired. For instance, the user may wish to rapidly dissipate heat if the food is cooking too quickly.

Since, the grilling module 121 includes its own bottom surface 140, the drawer can be opened to expose the food without the risk of drippings falling on the ground or surface beneath the grill since the bottom surface 140 will remain beneath the grilling surface 126 and will continue to catch any drippings even while the drawer is open.

In an alternate embodiment of the invention, the grilling module and drawer may be integrally formed as one unit.

Other advantages of this configuration include faster cooking and reduced fuel consumption because much less heat is dissipated when the drawer is opened and less dried-out food because the food cooks more quickly.

Further, because the grilling module and/or drawer is removably coupled to the housing, it can be completely removed from the grill for cleaning. Furthermore, because the cooking surface 126 is removably mounted to the grilling module 121, it can be easily removed for cleaning. Furthermore, the bottom surface 140 of the grilling module has a lip for retaining liquid. This feature helps keep drippings from falling out of the grilling module.

Furthermore, the lip allows the bottom of the grilling module 121 to be retain a layer of water, which will be heated by the flame when the drawer is closed so that the cooking grill can be used as a steamer as well as a conventional grill. The fact that the top 112*a* of the grill housing need not be opened to access the grilling surface allows the water to be heated quickly above boiling temperature and to remain at or above boiling temperature to generate the steam for steaming vegetables or other food on the grilling surface immediately above the boiling water.

Also in accordance with a particular embodiment of the invention, the grilling module 121 (or entire drawer in the aforementioned unitary embodiment) can be flipped over as illustrated in FIG. 4 and inserted into the cooking chamber upside down so that the bottom surface 140 of the grilling module is on top of the flame manifolds 115. The outer surface 140*a* of 140 can then be used as a frying or griddling surface in the cooking grill 100 for cooking fish, pancakes or other foods that cannot be cooked on a grated surface. In one embodiment, at least the outer surface 140*a* is coated with Teflon or another non-stick surfacing to provide a better, non-stick cooking surface for frying. In this embodiment, the cooking surface 126 may be removed from a drawer since it is not used in this configuration. However, in other embodiments in which the cooking surface might be non-removable from the grilling module (or drawer), the cooking surface can remain and will not interfere with the use of the cooking grill as a fryer in this configuration.

In one particularly useful embodiment, the grilling module 126 and/or drawer 121 includes folding side handles 119 to facilitate carrying of the grilling module in a balanced manner and without getting one's hands dirty.

In yet another embodiment of the invention, the grill is sold with (or the buyer can separately purchase) multiple cooking surfaces such as cooking surface 126. This allows the user to prepare several cooking surfaces with food before cooking and then simply exchange cooking surfaces when the food on one cooking surface 126 is cooked. The multiple cooking surfaces may have different configurations. For instance, the different surfaces may include a conventional grated grilling surface, a corrugated solid grilling surface, and a solid, non-stick frying or griddling surface for cooking foods like pancakes and flaky fish that would fall through a conventional grated grilling surface.

Also, if each cooking surface comprise two or more pieces, as illustrated in FIG. 3, then two different types of cooking surfaces can be used simultaneously so that the user can perform two different types of cooking simultaneously, for instance, frying on half of the cooking surface and grilling on the other half.

In a further embodiment of the invention, the drawer can be equipped with steps or another mechanism that permits adjustment of the height of the grilling module in the drawer so as to change the distance between the flame manifolds 115 and the cooking surface 126 to accommodate different types of cooking styles. For instance, for steaming, the grilling module 121 may be placed at a higher setting so that the flame manifolds 115 are close to the bottom 140 of the module closer to the water. For grilling, especially foods that should be cooked quickly, the grilling module 121 can be placed at a lower position in the drawer so that the flame manifolds 115 are closer to the cooking surface 126.

Figure 5:
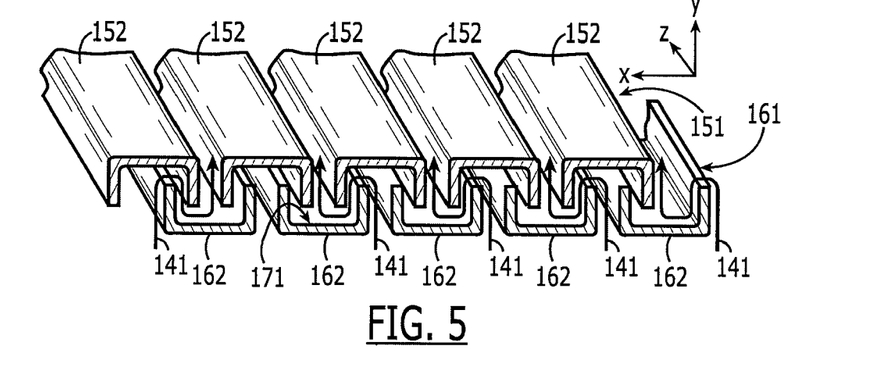

FIG. 5 illustrates a novel grilling surface that can be one of the interchangeable cooking surfaces. FIG. 5 is a close-up perspective view of a portion of a cooking surface in accordance with one particular embodiment of the invention. As can be seen, the grilling module comprises two, preferably, generally parallel, generally planar sets of grates 151, 161 vertically spaced from each other. Each grate is comprised of a plurality of generally parallel longitudinal members 152, 162, respectively. The two grates 151, 161 are joined at their edges to provide a unitary structure and, for each grate, the longitudinal members 152 or 162 may be joined together by transverse joining members 171 in order to provide sufficient strength to the overall structure. All of the components may be joined by welding or other attachment techniques. Alternately, the cooking surface may be cast or molded as a unit or as a few pieces that are then joined by welding or other techniques.

The two parallel grates 151, 161 are offset vertically (the y dimension in FIG. 5) from each other by a small amount, e.g., anywhere from about the thickness of the longitudinal members to about four times the thickness of longitudinal members. However, any other vertical spacing would be acceptable also. Furthermore, the longitudinal members 152, 162 of the first and second grates 151, 161 are transversely offset from each other in the transverse direction (the x dimension in FIG. 5) so as to form two offset rows of longitudinal members, one above the other, wherein the longitudinal members overlap partially with each other when viewed from directly vertically above. See, for instance, overlap distance b in FIG. 5.

In one embodiment, the members 152 of the top grate have upper surfaces configured to allow food drippings or other matter falling thereon to fall or slide off without becoming trapped thereon and the members 162 of the bottom grate have upper surfaces comprising a channel or other shape that will trap food drippings or other matter falling from above. In one particular embodiment, the longitudinal members of both gratings 151 and 161 have the same cross sectional shape, namely a U- or V-type shape or any other shape that has a channel on one side, including the illustrated shape of FIG. 5. However, the top set of longitudinal members 152 are upside down relative to the bottom set of longitudinal members 162 (i.e., rotated 180° about their longitudinal axes relative to each other). Hence, the upper longitudinal members 152 are upside down Us so the channels face downwardly and the bottom set of longitudinal members 162 are right side up Us so that the channel faces upwardly. In this manner, drippings from the food fall off the edges of the upper surface of the top set of longitudinal members 152. Due to the aforedescribed overlap of the top and bottom longitudinal members, these dripping will fall down from the edges of the top longitudinal members 152 onto the bottom set of longitudinal members 162. However, since the bottom set of longitudinal members 162 are oriented with the channels facing up, the drippings will fall into the channels 171 and substantially remain therein.

Thus, drippings from the food will generally slide down off of the longitudinal members 152 of the top grating 151 into the channels 171 in the longitudinal members 162 of the bottom grating 161, where they will remain.

This presents an ideal grilling situation since, as noted above, having the food drippings remain in the grill above the flames is desirable because the drippings volatilize when heated and add flavor to the food being cooked above it. However, the food does not come in contact with these drippings, which would be undesirable.

The longitudinal members of at least the top grating may be oriented slightly askew from perfectly horizontal (i.e., perfectly in the x, z, plane in FIG. 5) in order to facilitate the flow of drippings off of the top grating 151. This may be achieved by constructing the cooking surface with the longitudinal members (either both sets or just the top set) slightly tilted about either the z axis or the x axis. Alternately, the entire grilling module 121 may be mountable in the drawer at a slight angle from the horizontal about either the z or x axes.

This cooking surface keeps the drippings from falling onto the flame manifolds and the entire grilling module 121 keeps the drippings from falling to the bottom of the housing 112, which saves the manifolds and the housing from corroding. When the drippings become excessive, the grilling module and/or the cooking surface can be easily removed for cleaning. In another embodiment of the invention, the top and bottom gratings may be removably coupled to each other to even better facilitate cleaning of the longitudinal members of the bottom grating 161 by removing the top grating 151.

Furthermore, the grilling module still provides an open grating so that the flames and the heat have an unobstructed path through open space from the flame manifolds to the food, as illustrated by wavy arrows 141 in FIG. 5.

Figure 6:
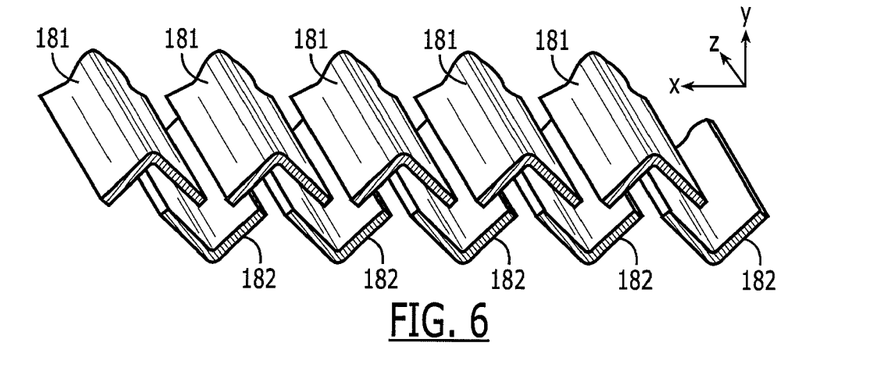

FIG. 6 illustrates a V-shaped embodiment of the longitudinal members 181, 182 of the cooking surface. One advantage of this particular embodiment is that the top set of longitudinal members 181 have an apex 182 in the middle from which the surface of the member 181 slopes downwardly in both directions. Therefore, drippings will more readily slide down from the top set of longitudinal members 181 into the channels 183 in the lower set of longitudinal members 182.

Figure 7:
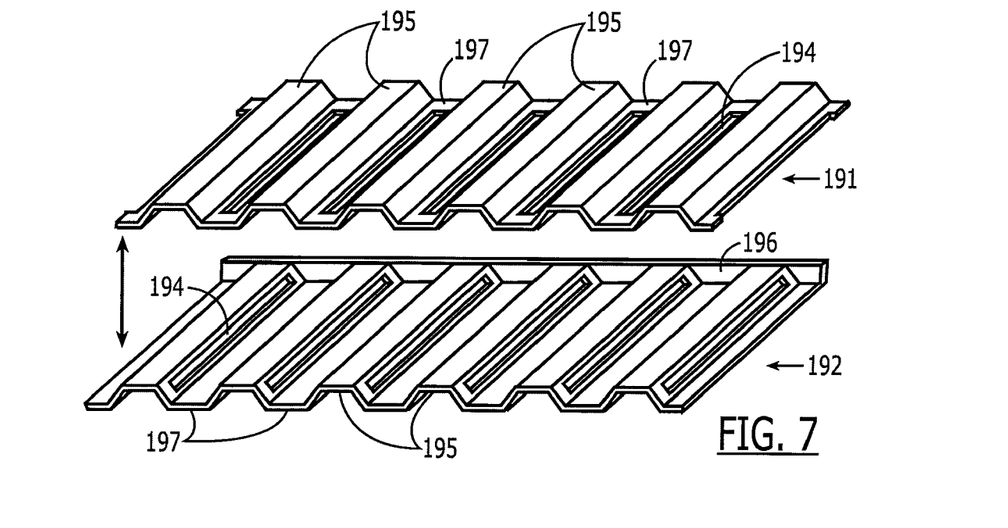

FIG. 7 is an exploded view of yet another embodiment of a fat removal cooking surface 190. In this embodiment, the cooking surface comprises two parallel closely spaced corrugated sheet surfaces 191, 192 defining a series of troughs (or channels) 197 and peaks 195. The corrugations may be U-shaped, V-shaped, square channel-shaped, parallelogram channel shaped (illustrated in FIG. 7), or any other reasonable shape. Longitudinal slots 194 are cut into the corrugated sheets 191, 192 to allow the flames and heat to more readily reach the food. Also, the slots in the top corrugated sheet allow the drippings to fall through the top corrugated sheet 191 into the troughs or channels 197 in the bottom corrugated sheet 192.

In at least the bottom corrugated sheet 192, the slots 194 should be positioned slightly above the bottom of the channel 197 so that the channel can trap the drippings without the drippings falling through the slots 194 in the bottom corrugated sheet. In the top corrugated sheet, the slots 194 may be formed in the same position to minimize manufacturing cost. Alternately, however, the slots 194 in the top sheet can be formed in the bottom of the troughs 197 to better facilitate the flow of drippings through the top sheet. The two sheets may be welded or joined together by any other reasonable means.

The embodiment of FIG. 7 is advantageous in that it is very inexpensive to manufacture since it essentially comprises two corrugated sheets with slots formed therein and joined together at their edges.

With respect to the fat removal cooking surfaces, it may be desirable to provide longitudinal end walls, such as wall 196 illustrated in FIG. 7 at the longitudinal ends of at least the bottom corrugated sheet (or bottom set of longitudinal members) in order to better retain more drippings without the drippings running out of the longitudinal ends of the longitudinal members (or corrugated sheet).

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A cooking grill comprising:
   a housing defining a substantially enclosed cooking chamber and having a side opening therein, the side opening oriented substantially vertically;
   a heating element disposed in the cooking chamber;
   a grilling module slidably disposable in the cooking chamber relative to the housing and the heating element through the side opening, the grilling module having a major panel and a peripheral wall extending substantially orthogonally from the major panel and including a support portion for supporting a cooking surface; and
   a cooking surface disposable in the support portion of the grilling module generally parallel to and spaced from the major panel;
   wherein the grilling module is adapted to be positioned within the cooking grill in either a first orientation in which the major panel is below the heating element and the support portion is above the heating element and a second orientation 180 degrees rotated from the first orientation in which the major panel is above the heating element and the support portion is below the heating element.

2. The cooking grill of claim 1 further comprising a drawer having a bottom tray and a front wall, the front wall sized and positioned so as to substantially fill the side opening in the housing when the drawer is inserted in the housing and wherein the drawer is adapted to removably accept and support the grilling module.

3. The cooking grill of claim 1 wherein the grilling module is rotatable independently of the heating element.

4. The cooking grill of claim 1 wherein the housing comprises a first housing portion and a second housing portion and a hinge connecting the first and second housing portions such that the second housing portion can be rotated upwardly about the hinge to open the housing to provide access to the cooking chamber.

5. The cooking grill of claim 1 wherein the peripheral wall of the grilling module comprises a lip around a periphery of the major panel for supporting a liquid in the grilling module when in the first orientation.

6. The cooking grill of claim 1 wherein the major panel of the grilling module comprises first and second primary, opposed surfaces, the first surface facing the support portion and the second surface facing away from the support portion and wherein the second surface is coated with a non-stick surfacing.

7. The cooking grill of claim 2 wherein the drawer is separable from the housing.

8. The cooking grill of claim 1 wherein the peripheral wall of the grilling module has a shoulder defining the support portion for the cooking surface.

9. The cooking grill of claim 1 wherein the peripheral wall of the grilling module comprises a front wall and first and second side walls disposed at opposite ends of the front wall, each side wall extending orthogonally to the front wall and orthogonally to the major panel and further comprising a foldable handle in each side wall for carrying the grilling module.

10. The cooking grill of claim 3 wherein the major panel of the grilling module is solid.

11. The cooking grill of claim 1 wherein the cooking surface is removably disposed in the support portion of the grilling module.

12. The cooking grill of claim 1 wherein the cooking surface comprises:
   a first corrugated sheet defining a series of troughs and peaks in the sheet;
   a second corrugated sheet defining a series of troughs and peaks in the sheet and positioned generally parallel to and vertically spaced below the first sheet;
   a plurality of slots formed at least the first sheet, the slots running parallel the corrugations such that matter falling from food placed on top of the grilling surface will fall through the slots into the troughs of the second sheet.

13. The cooking grill of claim 12 wherein the peaks and troughs in the first and second sheets are parallel to each other and define a longitudinal direction and further wherein at least the second sheet further comprises end walls at its longitudinal ends to retain matter in the troughs of the second sheet.

14. The cooking grill of claim 12 wherein the slots in the first sheet are formed in the troughs of the first sheet.

15. The cooking grill of claim 12 wherein the peaks and troughs in the first and second sheets are parallel to each other and define a longitudinal direction and wherein the peaks and troughs in the second sheet are of the same size and are offset laterally from the peaks and troughs in the first sheet.

16. The cooking grill of claim 1 further comprising:
   a movable surface for selectively substantially closing and opening the side opening.

17. A cooking grill comprising:
   a housing defining a substantially enclosed cooking chamber and having a side opening therein, the side opening oriented substantially vertically;
   a heating element disposed in the cooking chamber;
   a grilling module slidably disposable in the cooking chamber relative to the heating element and the housing through the side opening, the grilling module having a major panel and a peripheral wall extending substantially orthogonally from the major panel and including a support portion for supporting a cooking surface; and
   a cooking surface disposable in the support portion of the grilling module generally parallel to and spaced from the major panel;
   wherein the grilling module is adapted to be positioned within the cooking grill in either a first orientation in which the major panel is below the heating element and the support portion is above the heating element or a second orientation 180 degrees rotated from the first orientation in which the major panel is above the heating element and the support portion is below the heating element; and
   a first corrugated sheet defining a series of troughs and peaks in the sheet;
   a second corrugated sheet defining a series of troughs and peaks in the sheet and positioned generally parallel to and vertically spaced below the first sheet;
   a plurality of slots formed at least the first sheet, the slots running parallel the corrugations such that matter falling from food placed on top of the grilling surface will fall through the slots into the troughs of the second sheet;
   slots formed in the second sheet, the slots formed in the corrugations between adjacent peaks and troughs.

* * * * *